United States Patent [19]
Kelly, Jr.

[11] Patent Number: 5,900,610
[45] Date of Patent: May 4, 1999

[54] APPARATUS AND METHOD FOR TRACKING INVENTORY OF MULTIPLE GOODS IN MULTIPLE SHIPPING CARTONS

[75] Inventor: Gerald F. Kelly, Jr., Topeka, Kans.

[73] Assignee: Payless ShoeSource, Inc., Topeka, Kans.

[21] Appl. No.: 09/136,321

[22] Filed: Mar. 20, 1998

Related U.S. Application Data

[62] Division of application No. 08/711,421, Sep. 5, 1996, Pat. No. 5,793,030.

[51] Int. Cl.⁶ ....................................................... G06F 17/60
[52] U.S. Cl. .......................... 235/385; 235/383; 235/487; 235/375
[58] Field of Search ..................................... 235/375, 383, 235/385, 487

[56] References Cited

U.S. PATENT DOCUMENTS

| | | |
|---|---|---|
| 4,110,502 | 8/1978 | Baer . |
| 4,550,246 | 10/1985 | Markman .................. 235/385 |
| 4,610,359 | 9/1986 | Müller . |
| 4,651,150 | 3/1987 | Katz et al. . |
| 4,656,591 | 4/1987 | Goldberg . |
| 4,832,204 | 5/1989 | Handy et al. . |
| 4,910,058 | 3/1990 | Jameson . |
| 4,927,179 | 5/1990 | Ehret et al. . |
| 4,995,642 | 2/1991 | Juszak et al. . |
| 5,031,939 | 7/1991 | Webendorfer et al. . |
| 5,129,682 | 7/1992 | Ashby . |
| 5,147,699 | 9/1992 | Browning et al. . |
| 5,271,642 | 12/1993 | Jahier et al. . |
| 5,362,949 | 11/1994 | Gulick . |
| 5,393,965 | 2/1995 | Bravman et al. . |
| 5,449,201 | 9/1995 | Miller et al. . |
| 5,484,168 | 1/1996 | Chigot . |
| 5,600,565 | 2/1997 | Wagner et al. . |

*Primary Examiner*—Harold I. Pitts
*Attorney, Agent, or Firm*—Lathrop & Gage LC

[57] ABSTRACT

An apparatus and method for tracking inventory for goods having a variety of styles and characteristics, and which have a variety of possible shipping destinations. The apparatus of the invention includes a multi-part label that is attachable to each of the goods and has a removable portion that can be detached from the original label and reapplied to a shipping carton for a collection of goods. The method of the invention includes utilizing information from indicia applied to each of the goods in conjunction with an inventory distribution system and shipping cartons to keep track of the location of all goods at any time between sorting the goods for shipping and packing the goods for shipment, without requiring any manual steps, such as scanning, during sorting and packing of the goods.

16 Claims, 5 Drawing Sheets

APPARATUS AND METHOD FOR TRACKING INVENTORY OF MULTIPLE GOODS IN MULTIPLE SHIPPING CARTONS

CROSS REFERENCE TO RELATED APPLICATION

This application is a division of U.S. patent application Ser. No. 08/711,421, filed Sep. 5, 1996 now U.S. Pat. No. 5,793,030. Other related applications include (1) U.S. patent application Ser. No. 08/924,178, filed Sep. 5, 1997, which is a divisional application of U.S. patent application Ser. No. 08/711,421, filed Sep. 5, 1996; and (2) PCT patent application Ser. No. PCT/US97/15585, filed Sep. 5, 1996, which is a counterpart of U.S. patent application Ser. No. 08/711,421, filed Sep. 5, 1996.

BACKGROUND OF THE INVENTION

1. Field of the Invention

The invention relates generally to tracking of inventory goods that are packed into shipping cartons for a variety of shipping destinations, and in particular, to a system of labeling the boxes holding the goods and the shipping cartons to accomplish inventory control and shipping management of the goods and the shipping cartons.

2. Problems in the Art

General Setting of the Invention

A significant part of most manufacturing and distribution processes is control of the finished product. The manufacturer most times takes orders from wholesale or retail outlets. The orders must be processed in a manner that results in the correct goods being shipped to the correct outlet.

Accurate control of finished inventory is particularly difficult if a wide variety of types of goods are manufactured. Therefore, systems have been developed to attempt to keep accurate track of inventory of the manufacturer and how it is handled relative to orders from outlets.

For purposes of example only, the issue of inventory and shipping control will be discussed in the context of a company that manufactures (or has manufactured for it) a wide variety of goods, particularly a wide variety of shoe styles, colors and sizes. Generally, each variety of shoes will come in a pair (left and right feet) and be placed in a box or bag. For purposes of this discussion, the container of the shoe pair will be generically called a shoe box, with the understanding that there may be items that do not come in pairs or do not come in a container.

The company has a central facility or facilities, such as a distribution center, that continuously receive(s) orders from its retail shoe outlets located around the country and which has/have built up an inventory of the variety of shoes. Each central facility processes the orders, which normally call for different shoes. Some orders can ask for more than one of a certain style, color and size. For example, one retail outlet may order five of the identical goods (e.g. red, size 9, style A). Some orders ask for only one shoe pair. Some orders ask for a wide variety of shoe pairs in a number that requires multiple shipping cartons or cases to transport that quantity of goods to the particular store. For purposes of this discussion, the term shipping carton or carton will refer to the container in which one or more items are shipped to the retail outlet.

Conventional Methods and Systems

Presently, automated or semi-automated systems are utilized by some companies for handling of finished goods, here shoes, for example. Machine-readable indicia can be placed on the shoe boxes to identify their contents, including information related to style, size, color, and so on. One example of machine-readable indicia and the machine that can read it is laser scanners and bar codes, such as are widely known.

However, it is common for manufacturers of a variety of styles and/or sizes of shoes to ship a number of different shoes to a number of different locations. It is difficult to accurately keep track of inventory and shipping instructions.

One system in use utilizes the bar codes on each shoe box to know the universe of shoes in inventory at the manufacturer at any given time. The codes for each box are scanned and stored in a central computer, by apparatus and methods well known in the art. The orders from the retail outlets are retrieved from the manufacturer's inventory and are organized in a fashion so that they can be packed for shipping to the various shipping destinations, in this example the various retail outlets.

There is a need to identify individual shoe boxes packed within each shipping carton so that the manufacturer can keep track of the inventory. Presently, one common way to do so is to have the worker(s) which is/are packing the cartons manually individually scan the bar code of each box as or after it has been packed in the carton, or at least manually scan the last box packed into the carton. A label can also be placed on the carton which has information regarding, for example, shipping destination. This can also be scanned.

Systems have also been developed which allow for automated sorting of shoe boxes out of the manufacturer's inventory into what will be called packing lanes. The sorting system is designed to know the contents of each box placed on a conveyor system and, importantly, is also designed to know the position of each box on the conveyor system. A controller, usually a computer having information related to the contents of each box, its position on the conveyor system, and the orders for various shipping destinations (usually the retail outlets), then autonomously distributes a sequence of shoe boxes to a shipping lane in a manner that the workers packing the shipping cartons will have in one group all the boxes that should go to a pre-determined shipping destination. As can be easily appreciated, this significantly reduces the time and human effort needed to collect the particular boxes ordered by an outlet, as well as the time and human effort needed to pack the relevant shipping cartons.

Figure 8:
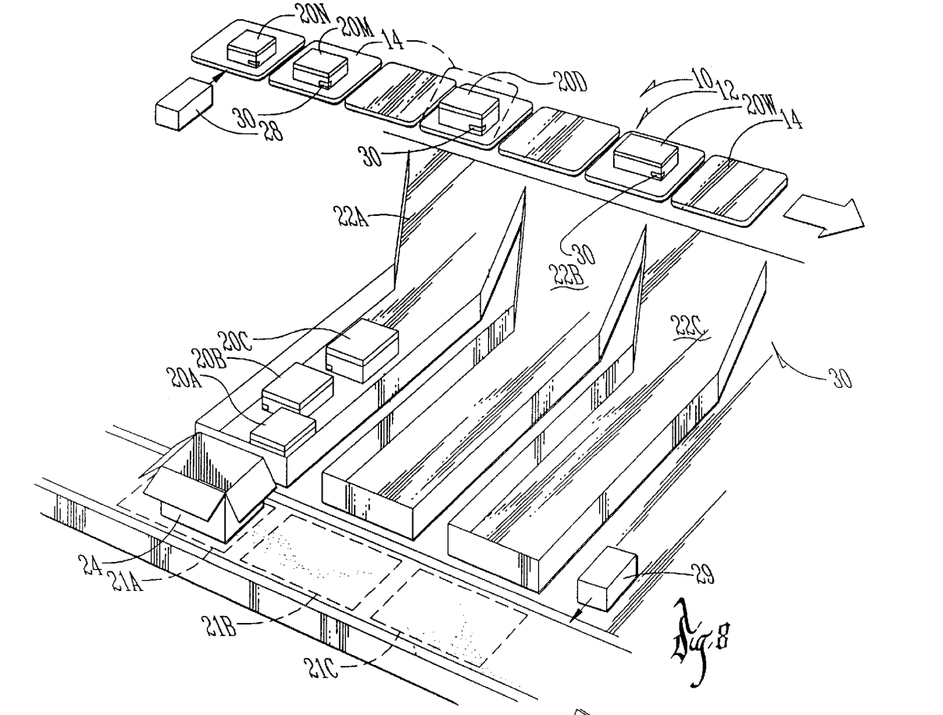
FIG. 8 is a perspective diagrammatic view of a portion of a sorting system, shipping lanes, and a shipping carton that can be used with the boxes and labels of FIG. 1.

An example of such a sorting system is generally shown at FIG. 8. An electromechanical sorting/conveyor system 10 is shown, such as are known in the art, and transports individual shoe pairs within boxes 20 to a packing station 21. Boxes 20 are ultimately placed into cartons 24 for delivery to specific stores. A bar code 30 located on each shoe box 20 is scanned by the sorting equipment, which places the shoe box 20 on a conveyor section 14 (here a tilt-tray) for transport to each packing station 21. The tilt-tray 14 deposits the shoe box 20 at the beginning of a lane 22 which leads to a packing station 21. Since the sorting of the shoes, their position within the lane, and the number of pairs packed into each carton is random, in conventional existing systems the worker packing the shoes must scan the individual shoe boxes to determine which shoe pairs are packed within each carton. This information is needed because the cartons are randomly packed into truck trailers and delivered to another location where they are unloaded and stored until they are delivered to stores. If a carton is lost, delayed, or damaged in transit, and inventory correction must be made correctly, the exact number and unique type of shoes must be known. The need for the worker to individually scan the shoe pairs prior to packing takes enough time that elimination of such a step could result in an estimated 30% productivity (pairs packed/time unit) improvement.

This savings in human labor is particularly valuable in systems that have multiple packing lanes, each of which can be serially filled with groups of shoes intended for the same shipping destination. The packer or packers simply must concentrate on identifying what set of boxes go to which destination. This is simplified by having cartons with pre-printed machine-readable indicia regarding shipping destinations and shipping lanes dedicated to specific destinations. In such a situation, the packer really only has to concentrate on which of the serially distributed boxes in each shipping lane is the last for a particular destination or carton. Once the last box for a carton is identified, packing of the next carton commences. The process can proceed quickly and accuracy is high.

It is to be understood that even relatively small savings in labor time in absolute terms for any given carton translates into substantial savings in labor costs and increase in through-put when analyzed from the viewpoint of hundreds and thousands of cartons in large scale distribution operations. Therefore, the above-described types of systems have realized truly beneficial gains for companies with large scale distribution centers.

Similar systems to that described above also exist in the art with resultant savings in time and labor costs.

Short-comings/Needs

While the use of automated systems or similar systems to that described above has increased the efficiency, accuracy and economy of keeping track of inventory of this type, there are still short-comings and there is a need for improvement in this art.

One example is the present need for the packers, even though boxes intended for each shipping carton are presented in sets in the shipping lanes, to individually identify each shoe box in each shipping carton. Such information is essential so that accurate and complete retail outlet billing records, contents by carton, and bills of lading can be prepared. Without this information, true inventory control is lost.

One solution would be to manually scan the bar code or other indicia on each box that is put into a container. While advanced equipment such as radio frequency (RF) laser scanners can be used by the packers (which can instantaneously communicate by radio transmitters to the central control unit), the cost, in terms of time and labor expense, is prohibitive. As alluded to above, the automated conveyor systems try to address this problem by the known order in which the boxes are placed in each shipping lane. The packer presently has only to scan the bar code on the last box placed in each carton. By knowing the identity of the last box in the carton, the identity of all boxes in the carton is known.

However, the mere step of having packers manually scan each of the last boxes packed in each carton is time-consuming. If this step could be substantially eliminated, an improvement in efficiency and economy could be realized, at least in terms of time spent and labor costs. This is especially true for large scale distribution operations.

Objects, Features, and Advantages of the Invention

Therefore, a primary advantage of the present invention is the provision of an apparatus and method of inventory control which solves or improves over the problems and deficiencies in the art.

Further exemplary objects, features, and advantages of the present invention include the provision of an apparatus and method of inventory control which:

1. eliminates the requirement that either the contents of each box or the last box placed in a shipping carton be identified manually or with procedures requiring manual steps;
2. allows easy placement of indicia onto each shipping carton that can be used to identify the contents of the carton;
3. allows the identifying information to be placed on each of the goods, or packaging containing the goods, at the point of manufacture or collection of the goods for shipment to outlets;
4. enables convenient and efficient machine-readability at any point in the manufacturing process, including after being packed in a carton;
5. enables beneficial and efficient utilization with other important information, such as shipping destination information, in a manner that is efficiently machine-readable;
6. produces a substantial and realizable savings in human labor time and cost;
7. can utilize a multi-part label that can be made by conventional manufacturing techniques, is non-complex in structure, and yet allows a part to be detached to reduce the amount of manual labor needed to keep track of inventory.

These and other objects, features, and advantages of the present invention will become apparent with reference to the accompanying specification and claims.

SUMMARY OF THE INVENTION

The present invention includes a system to track inventory in which knowledge of the location and content of any of the goods involved with the system is known. Information regarding the individual goods is placed on the goods during manufacturing, or during preparation for distribution to wholesale or retail outlets. The information is known by a central controller. A sorting system has the capability of correlating the information of any of the goods with a location in the sorting system, and therefore the controller can control the placement of any of the goods to a shipping lane for packing into shipping cartons. The information from any of the goods can be placed onto the shipping carton, and thereby, the controller knows the contents of the entire carton.

In one aspect of the invention, the information on the goods is in the form of a label and the label can be configured so that the information can be transferred and placed on a shipping carton. The information placed on the shipping carton can be machine-readable, and therefore, any need to read the information from any of the goods placed in the box is eliminated.

The method utilizing the system or label results in elimination of a time-consuming and labor consuming step in inventory control while maintaining accurate information about the location of each item of inventory.

DETAILED DESCRIPTION OF THE PREFERRED EMBODIMENT(S)

Overview

To achieve a better understanding of the invention, a preferred embodiment will now be described in detail. Frequent reference will be taken to the drawings which have been identified immediately above.

Reference numerals will be used to identify certain parts and locations in the drawings. The same reference numerals will be used to identify the same parts and locations throughout the drawings unless otherwise stated.

The preferred embodiment will be discussed in the context of a shoe manufacturer. The pairs of shoes in this example will all be contained within a shoe box. It is to be understood, however, that the invention pertains to other types of goods, whether contained in boxes or bags or other packaging, or not.

Furthermore, the preferred embodiment will be discussed in the context of an automated sorting system where the shoes, once manufactured are paired by characteristics such as style, shoe size, and color. Other characteristics are possible. The sorting system can include a central controller, preferably computerized, that contains information about each shoe box and its location within the sorting system. Such systems are widely known. An example of one in current use is made by the Kosan/Crisplant Company and identified by the trade name and/or product code of Kosan Sorter. Other systems are available.

Sorting System

By referring to FIG. 8, a portion of such a sorting system is depicted. Sorting system 10 includes a conveyor 12 having individual sections 14 (here tilt trays such as are known in the art). As shown in ghost lines in FIG. 8, each section 14 is independently controllable by instruction of the controller (not shown) to deposit any shoe box 20 into one of a plurality of shipping lanes 22. In this sorting system, conveyor 12 moves in a path and carries a plurality of boxes 20. It is again to be understood that at the controller, each section 14 of conveyor 12 can be correlated to whichever box 20 it is carrying at the time. Additionally, the controller knows the position of any section 14 that needs to be attained relative to a desired packing lane 22 to deposit a box 20 in that particular lane 22.

Thus, as shown in FIG. 8, the sorting system can deliver any box 20 carried on it to any packing lane 22. This allows the sorting system to deliver a group or set of boxes 20, all intended for the same shipping destination, to the same shipping lane. As illustrated in FIG. 8, boxes 20A, 20B, 20C, and 20D are all required to be shipped to retail outlet X in city Y, in country Z. The sorting system not only can deliver those boxes to shipping lane 22A, but can do so in a manner whereby the sequence of the boxes in lane 22A is known by the controller. Therefore, by simply knowing the last box 20D in lane 22A that goes to location X, Y, Z, the controller also knows the identity of boxes 20A–C.

This type of sorting is well known in the art as well as the ability to identify the contents of a group or set of boxes 20 by only knowing the identity of the last box 20 in the group. The details of such a system are well known to those skilled in the art and are available through purchase of such systems in the marketplace. They do not independently form the invention and therefore are not explained in more detail here.

The preferred embodiment is also described in the context of a distribution system that correlates each of its shipping channels to one or more shipping destinations, and has a ready made stock of shipping cartons 24 available in close proximity to the relevant shipping lanes. Cartons 24 here have indicia, in the form of a bar code printed on a label, that is affixed to the exterior of each carton 24. The label is called a carton or case label 26. The indicia includes both text and machine-readable portions. The information in the indicia usually includes at least information regarding the identity of the shipping destination for that carton 24, such as the X, Y, and Z information.

Figure 4:
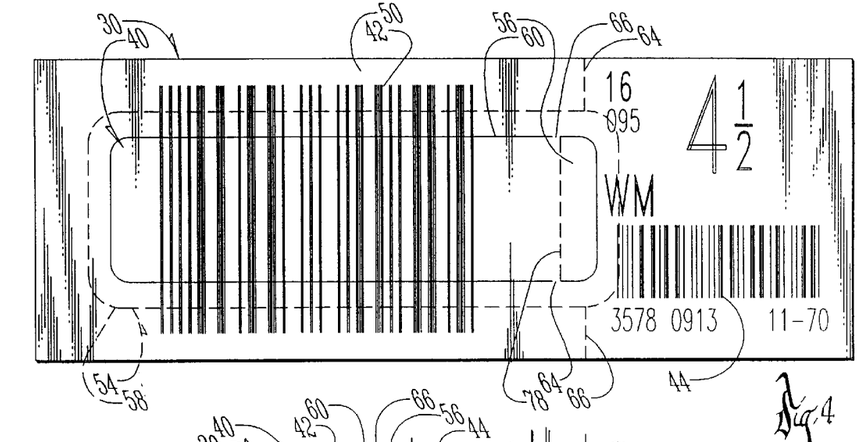
FIG. 4 is an enlarged plan view of the label of FIG. 1 prior to placement on the box of FIG. 1.
Figure 5:
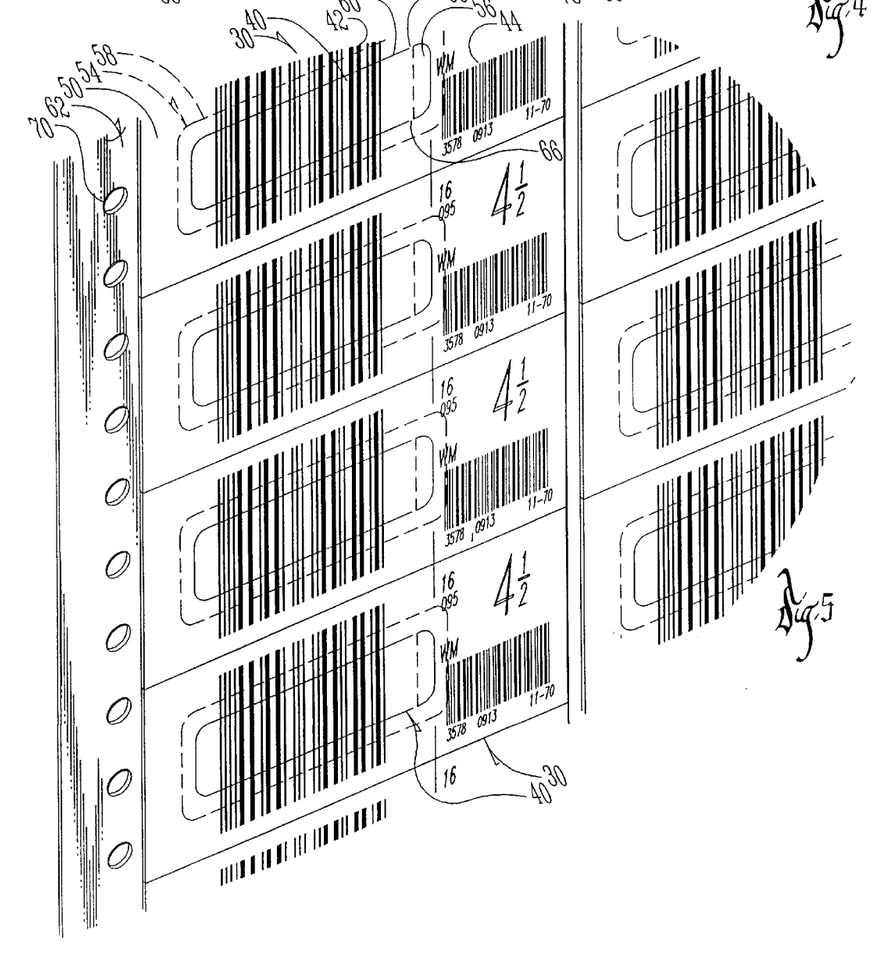
FIG. 5 is a perspective view of a plurality of labels of FIG. 4 on a backing sheet.
Figure 6:
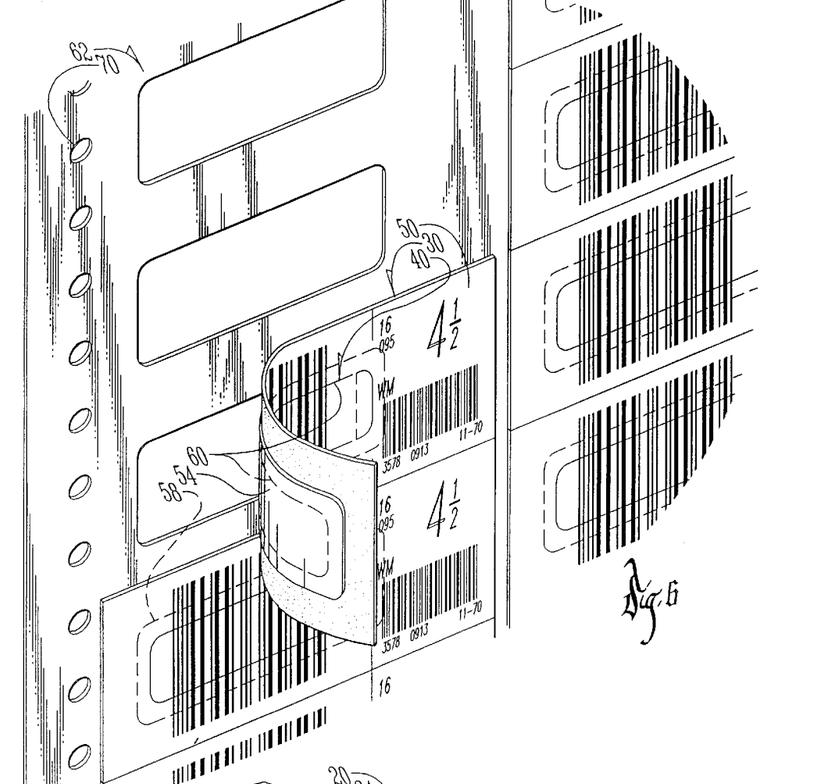
FIG. 6 is similar to FIG. 5 but shows a single label being removed from the backing sheet.
Figure 7:
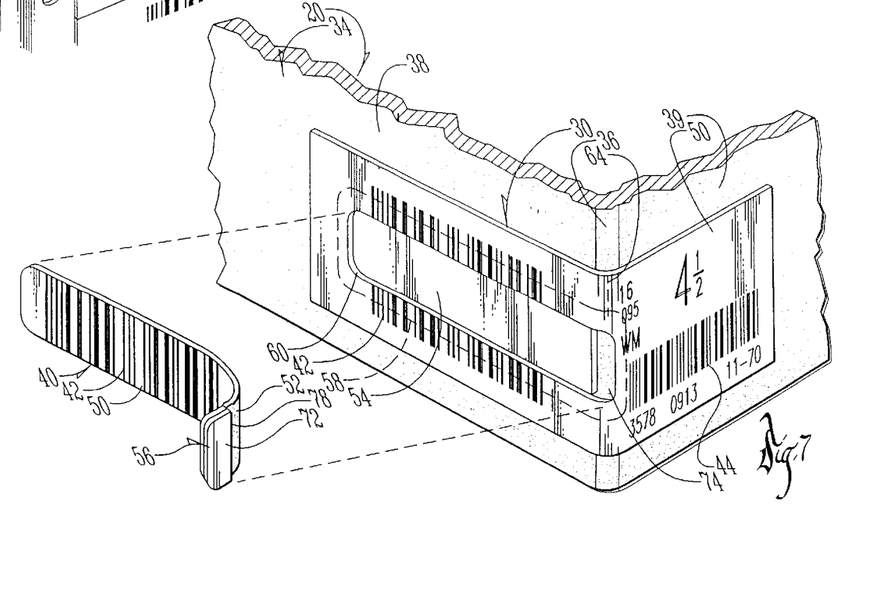
FIG. 7 is similar to FIG. 2 but shows in exploded form a secondary label that is removable from the main label attached to the box.

Additionally, the preferred embodiment is described in the context of each box 20 having a machine-readable label 30 (here having pre-printed bar code information) applied to it. An induction scanner 28 (a laser bar code reader such as are widely known in the art) is placed upstream of the shipping lanes 22, preferably before the boxes 20 are placed on conveyor, and can scan labels 30 (see also FIG. 4), which are placed on each box 20. Since each label 30 contains, in bar code form, information regarding style, color, and size of the shoes contained in it, the controller will store that information, and importantly, will at the same time correlate the contents of each box 20 with a position on a section 14 of conveyor 12. Label 30 will be described in more detail later in this description.

Apparatus

Containers and Goods

Figures 1, 2, 3:
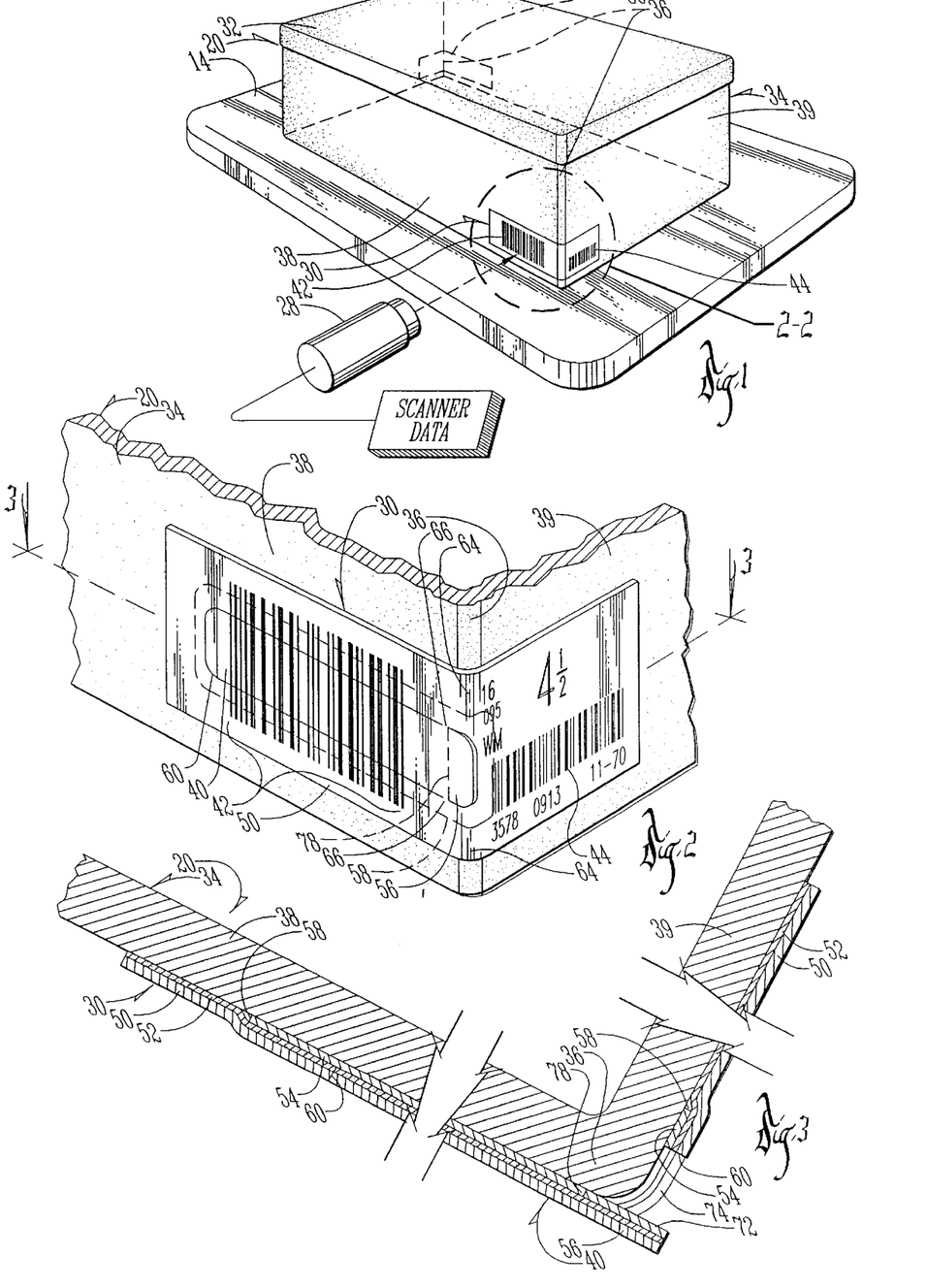
FIG. 1 is a perspective view and partial diagrammatic view of a shoe box bearing a machine-readable pre-printed label, with the box positioned on a sorting system conveyor, and a machine for reading the label in operative position.
FIG. 2 is an enlarged perspective view of the label shown in FIG. 1.
FIG. 3 is a still further enlarged sectional view taken along line 3—3 of FIG. 2.

FIG. 1 shows shoe box 20 in more detail. Box 20 includes a lid 32 and a main portion 34. For purposes of this description one corner of the four corners of box 20 is particularly identified by reference numeral 36. Adjacent walls 38 and 39 of main portion 34 are also identified. A pair of shoes (not shown) is placed into box 20 for shipment and storage.

In the preferred embodiment, label 30 is placed so that a part of it extends outward from corner 36 on wall 38, and another part extends outward from corner 36 on wall 39.

Figure 9:
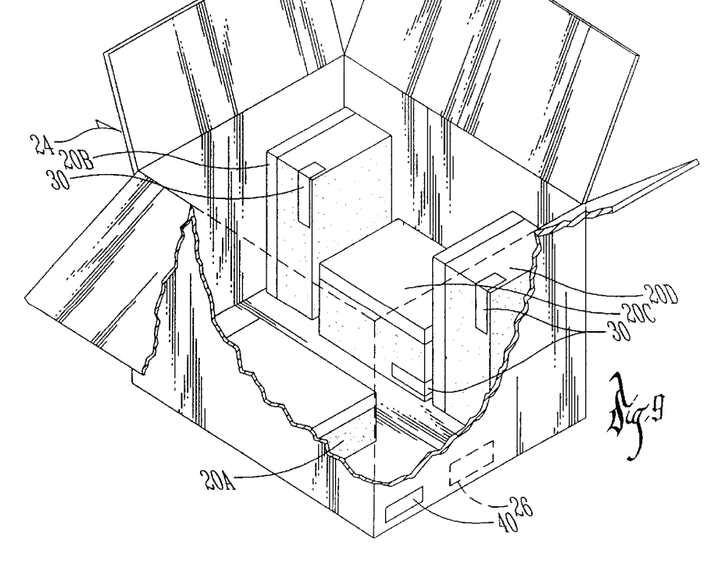
FIG. 9 is an enlarged perspective view of a shipping carton of FIG. 8 with a cut-away portion illustrating placement of boxes such as shown in FIG. 1 into the shipping carton, and further showing the application of a secondary label to the exterior of the shipping carton.

FIG. 9 shows in detail the structure of an example of a shipping carton 24, a conventional box, usually of cardboard, having an open top that is closable by flaps surrounding the top. Other types of shipping containers are possible.

Label(s) On Shoe Box

By referring now in particular to FIGS. 1–7, more detail of label 30 can be seen. As previously described, label 30 is intended to and therefore is intentionally configured to be placed around a corner of shoe box 20, in the position shown in FIG. 1. It is to be understood, however, that the placement of label 30 around a corner, or in the precise position shown in the drawings is not a limitation of the invention.

As shown by FIG. 2, label 30 of the preferred embodiment has printed matter pre-printed on its outer facing side. Specifically label 30 contains indicia in bar code section 42 positioned on wall 38 of box 20, and indicia in bar code section 44 positioned on wall 39 of box. The difference between bar code sections 42 and 44 is: (a) the size of code region (i.e., section 44 being the smaller); (b) section 42 has 4 digit lot no., 2 digit size, a random and a check digit; and (c) section 44 has 10 digits: 4 digit lot no., 2 digit size, 2 digit product code, random digit and check digit.

Additionally, text and numerical information is contained on the side of label 30 positioned on wall 39 of box 20. Notably, this text includes the shoe size.

By referring to both FIGS. 2 and 3, the physical structure of label 30 can be seen. The outer-most layer of label 30 (see reference numeral 50 in FIG. 3) contains the printed matter described above. Label 30, for these purposes also referred to as main label 30, has adhesive applied substantially across its inner surface to allow it to be mounted onto box 20. As will be explained in more detail later, when main label 30 is applied to box 20, a portion within the perimeter of main label 30 is removable and itself can be adhered to another container, preferably carton 24.

By referring to FIG. 2, this removable portion is defined by cut-line 60 and is referred to as secondary label 40. The area indicated by dashed line 58 in FIG. 2 defines a releasable backing portion 54 that is interposed between adhesive layer 52 and main label 30, and in particular backs secondary label 40. Even more particularly, backing portion 54 (see FIG. 3), defined by dashed line 58 in FIG. 2, extends in all directions beyond the perimeter of secondary label 40. It therefore shields all of adhesive layer 52 corresponding to secondary label 40 from being used while main label 30 is adhered to box 20.

FIGS. 2 and 3 also show that when label 30 is mounted around the corner of box 20, an end portion or tab 56 of secondary label 40 can be influenced to resist bending or be separable from main label 30 so that it extends outwardly and is grippable by a worker. This allows the worker to peel off the secondary label 40 and separate it from the main label 30. As will be discussed further below, because the size of backing portion 54 exceeds the size of the opening defined by cut line 60 (which defines the perimeter of secondary label 40), backing portion 54 remains captive underneath main label 30 but that portion of adhesive layer corresponding with the shape of secondary label 40 separates with secondary label 40. This is because the adhesive force between the back of secondary label 40 and the adhesive layer at that location is much stronger than with the releasable backing layer portion 54 at that location.

Figure 10:
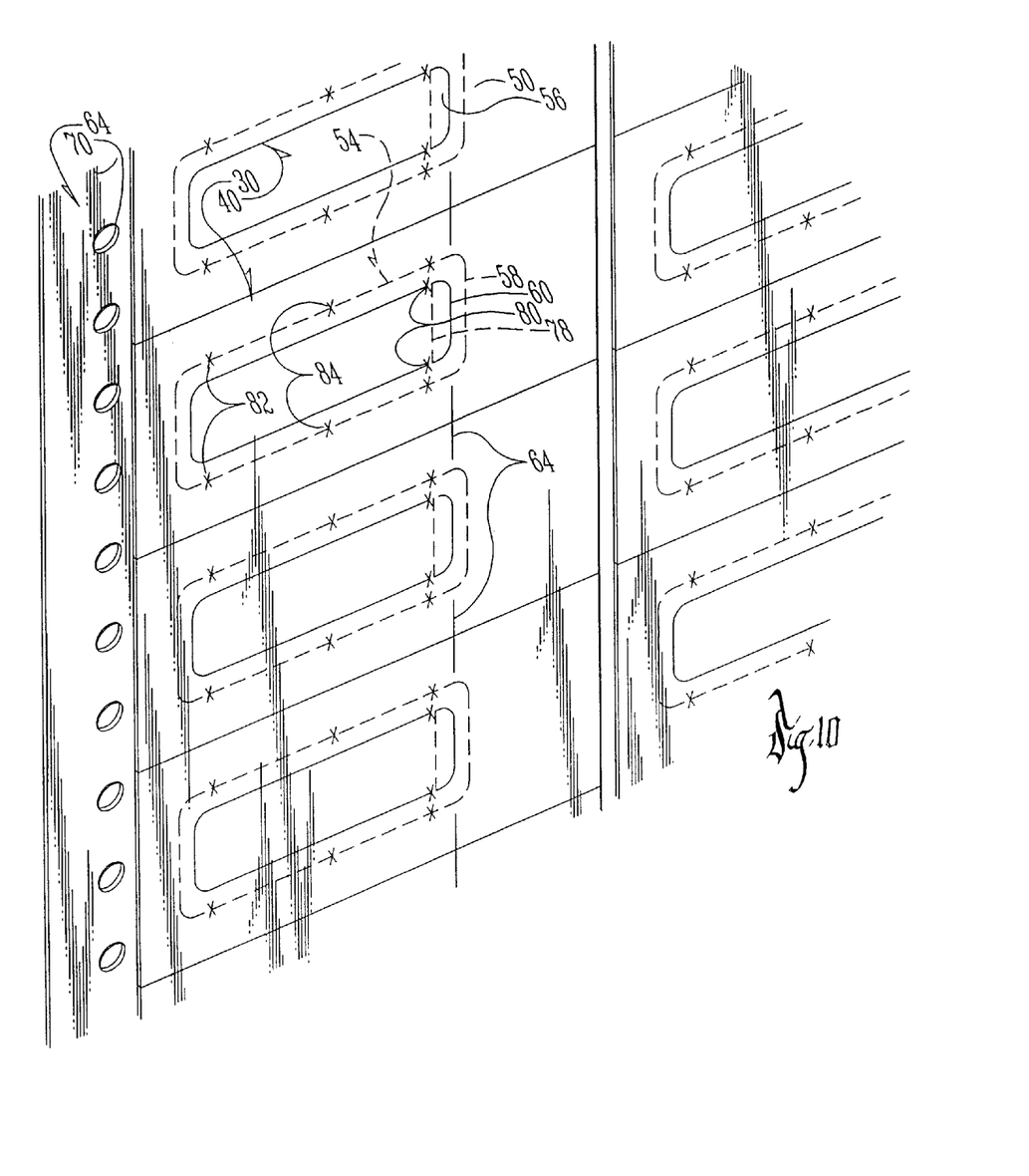
FIG. 10 is a plan view of a sheet of blank labels on a backing sheet with diagrammatical indications of structural features of the labels.

FIG. 10 illustrates how a plurality of labels 30 can be manufactured. They can be formed by conventional die cutting procedures by placing a sheet of label stock, on releasable backing, on a web and feeding the web/label/backing combination through label forming equipment during construction. This general process is conventional and known in the art. Ultimately, the die cut combinations are fed through a printer or like handling equipment to place the indicia on the face of labels 30. This procedure is also conventional and well known in the art.

Main label 30 can be made of blank label stock with adhesive substantially covering its bottom face. First and second die cuts can be formed in the main label and backing respectively. The cuts can be created by using die that produces certain cuts in plain label stock.

The cuts are such that they create a main label 30, and a secondary label 40 positioned entirely within the periphery of the main label 30. The first die cut (see line 60 in FIG. 10) defines secondary label 40 within main label 30, and the second die cut (see line 58 in FIG. 10) forms a first removable segment 54 of the backing which overlaps the first die cut. The adhesive between main label 30 and the backing sheet 62 exerts a greater force on the removable backing portion 54 than does the rest of the backing 62 so that when the main label 30 is removed from the backing 62 the removable backing portion 54 detaches from backing 62 and remains with the main and secondary labels 30 and 40 (see FIG. 6).

Tab 56 is integral with and extends outwardly from the secondary label 40. When main label 30 is applied to a package (e.g. shoe box 20), secondary label 40 does not stick to the package 20 because of the presence of backing portion 54. A perforation line (or line of weakness) 78 connects tab 56 to secondary label 40 so that it can be detached and discarded.

Backing sheet 62 is coated with a suitable release agent such as silicone. Adhesive layer 52 can be a pressure sensitive adhesive. Removable backing portion 54 (of release material) underlies both the main and secondary labels 30 and 40 and is cut around secondary label 40 so that when main label 30 is removed from backing 62, secondary label 40 and a portion of the backing 62 underlying secondary label 40 separate from the remainder of the backing but stay attached to main label 30. After main label 30 is applied to a surface such as a box 20 containing shoes, secondary label 40 may be removed from the underlying backing portion 54 without reducing its ability to stick to the other surfaces.

FIG. 10 illustrates additional manufacturing details about labels 30. The area labeled 56 represents tab 56. Backing portion 54 is cut in the shape shown, whereas the face of label 30 is cut in outline shown except for the part that abuts secondary label 40. Line 60 indicates the cut line for secondary label 40 (face cut) whereas line 58 indicates the cut line for backing portion 54 (backing cut, and not face cut).

Ties, indicated at 80, 82, and 84 and such as are known in the art, are left so that some connection to the remainder of label 30 exists for both secondary label 40 and backing portion 54. In the preferred embodiment, ties 80 of backing portion 54 are 0.0026 ins.; ties 82 of backing portion 54 are 0.0020 ins.; and ties 84 of secondary label 40 are 0.0026 ins.

In the preferred embodiment the dimensions of label 30 are 3 7/16" long and 1 1/8" tall. Backing portion 54 is 2 1/4" long and 3/4" tall. Secondary label 40 is 2 1/16" long and 1/2" wide. These dimensions illustrate how backing portion 54 is within the perimeter of label 30, and secondary label 40 is within the perimeter of backing portion 54.

FIG. 10 also shows score lines 64, which are optional, on either side of secondary label 40 generally aligned with the outer end of tab 56. These score lines weaken label 30 to assist it in bending around the corner of box 20. Again note that the score lines 64 do not extend through secondary label 40, which influences tab 56 to stick up. Score lines (or fold perforations) 64 are 1/32" behind the outer edge of tab 56.

Therefore, FIG. 10 illustrates how multiple labels 30 are manufactured on a sheet of label stock over a backing of release material, yet each label 30 results in a multi-part label having a portion that is removable and which can be adhered to another location.

It should be noted that the printing of labels 30 can be done solely in-house by the company using the labels on blank label stock if desired to keep information proprietary. The manufacturing of the labels can be done on the web forms in combination with a plurality of substantially identical labels. The labels are connected together at lines of weakness to allow each label 30 to be removed and placed on a box 20 (see FIG. 6). However, other manufacturing techniques can be used.

The adhesive is preferably permanent adhesive completely covering the bottom face of the main and secondary labels 30 and 40. However, other types such as removable or repositional adhesive can be utilized if desired. The backing layer 62 is conventional release material such as is known in the art.

An example of where a label such as label 30 could be a "S. T. Warren type 340" manufactured and obtained is UARCO, Inc., a paper and business forms supplier having principle offices at P.O. Box 71660, Chicago, Ill. 60694-1660. Label 30 can be described as a removable strip adhesive bar coded label, a multi part label, or a multi-part adhesive form.

System Operation

Prior to reaching the distribution center, main label 30 is applied to boxes 20 containing goods of various styles and sizes. Main label 30 is bent around corner 36 of box 20 when it is applied. When main label 30 is bent, secondary label 40 separates from the removable backing portion 54 underlying it and remains straight so a tab end 56 of secondary label 40 extends outwardly from corner 36 where it may easily be grasped for removing secondary label 40 from the box 20. To further enhance the ability to grasp the secondary label 40, the adhesive underlying the tab end 56 may be omitted or coated with an agent to reduce its ability to stick to the backing portion 54. Alternatively, the backing may be cut surrounding the tab end 56 so the end is free to raise off the surface.

At the distribution center, the labeled boxes 20 are sent down a production line in a known sequence of styles and sizes and in groups bound for particular destinations. Each of the groups is packed in one or more cartons 24. The workers pack the cartons 24 in the order in which the boxes 20 are transported down the line and then remove the secondary label 40 from the last box 20 placed in the carton 24 and apply the removed secondary label 40 to the carton 24. Because the sequence of styles and sizes are known, the contents of any particular carton 24 can be readily determined by knowing the identities of the first and last boxes 20 placed into the carton 24.

A scanner 29 (see FIG. 8) positioned above the production line, downstream from the packers, identifies the last box 20 placed in the carton 24 by reading the bar code on the removable portion 40 of the label 30 which was applied to the carton 24. The secondary label 40 previously applied to the carton 24 identifies the last box 20 placed in the carton 24. Because the identity of the last box 20 placed into the previous carton 24 and the sequence of boxes 20 is known, the identity of the first box 20 in the current carton 24 is readily ascertainable. Thus, the contents of any carton 24 may be determined.

Alternatives/Options

The included preferred embodiment is given by way of example only, and not by way of limitation to the invention, which is solely described by the claims herein. Variations obvious to one skilled in the art will be included within the invention defined by the claims.

As previously mentioned, the goods discussed herein are shoes, and in particular are pairs of shoes matched according to at least style, color, and size. Other goods, with or without containers, could be used with the system according to the invention. Indicia identifying the goods could be placed directly on the goods if containers were not used. No significance should be placed on the fact that shoe pairs are described here, as it would also work with singular goods.

Labels can be made of single side label stock with a backing sheet. No special adhesives needed. Only one is sufficient, no need for two or more different types. However, optionally, a stickier rubber-based adhesive (rather than the typical acrylic adhesive) is used to ensure that the removable portion will stick when it is re-applied to the carton.

If the goods themselves were not in containers, or otherwise are needed or desired to be labeled, an example of such a label would be on a hanging page attached to the item, or a reusable "tote" type tray used to convey the item to the packing location.

Perforations can be created on each side of removable portion 40 so that it is weakened and easily bends around the corner 36 of the box 20. However, the removable portion 40 itself is not perforated so that it tends to remain straight. Because the removable portion 40 remains straight, it sticks past the corner 36 when label 30 is applied to box 20 to form tab 56 which a worker may grab to remove the portion 40 from label 30.

At least two different techniques can be used to reduce the tab's 56 adhesiveness so that it lifts off the backing 64 and remains straight to form the tab 56. In the first technique, tab 56 is formed by coating the tab adhesive with a release agent so that it does not stick to backing 64. In the second technique, the backing 64 is cut under tab 56 so that the backing remains attached to tab 56 and tab 56 does not stick to the box 20.

The removable, adhesive segment 40 can include a special bar code, which is part of what is called the production control label (PCL). The bar code contains product information. It can be the uniform product code (UPC) but preferably is unique to and used solely by particular company and will be called a production control label (PCL) to differentiate it from the UPC type bar code. The information coded onto the PCL can be: position 1 — gender (M for men, W for women, K for kids); position 2 — lot number (4 digit no.); position 3 is size (2 digit no. — size digit); position 4 is a random digit (0–9); and a check digit (Modulus 11 check digit).

Scanner 28 can be a bar code reader such as available from ACCU-SORT Systems, 511 School Home Road, Telford, Pa. 18969-1196, a manufacture of laser scanning equipment, under model number "Double-X".

Scanner 28 must recognize the unique bar codes (both PCL and case label) used for the particular company using the system. This scanner technology is widely available, and though it is critical to the present invention's process does not independently form nor is it claimed independently as a part of this invention.

FIG. 8 illustrates that a down-stream scanner 29, like scanner 28 could be used to read carton label 26 as well as removable secondary label 40 that is detachable from label 30. By means known in the art, scanner 29 can create an electronic record of the "married" images of the bar codes of label 40 and the carton label 26, which together will constitute the identification of the contents of a specific case as required.

I claim:

1. A labeling system for identification and inventory tracking purposes comprising:

a releasable backing sheet;

a plurality of main labels positioned on the backing sheet, the main labels having a bottom surface containing self-adhesive that releasably adheres to the backing sheet, but which can be separated from the backing sheet by application of sufficient separation force and having a top surface containing indicia bearing information;

a plurality of removable secondary labels, each formed within the periphery of a respective one of the plurality of main labels, each secondary label including indicia containing information;

a plurality of removable portions of the backing sheet, each generally aligned with and containing all of a respective one of the plurality of secondary labels;

each of the removable portions of the backing sheet configured to separate from the remainder of the backing sheet when the separation force is applied to the respective main label and to remain adhered to the bottom surface of the respective main label so that adhesiveness of the respective secondary label is maintained; and each of the secondary labels including a tab configured to be separated from the respective main label, gripped and pulled with a force to separate the secondary label from the respective removable portion of the backing sheet, the secondary label then being available to adhere to a different location such as on a shipping container.

2. The labeling system of claim 1 further comprising perforations in each of the main labels aligned with a proximal end of the respective tab to enhance bendability of the respective main label at the location of the respective perforations.

3. The labeling system of claim 1 wherein the indicia is machine readable.

4. The labeling system of claim 1 wherein the indicia is human readable.

5. The labeling system of claim 1 wherein the indicia is machine readable and human readable.

6. A multipart adhesive form for improved inventory tracking comprising;

a backing layer;

a first frangible portion incorporated into the backing layer;

a label layer over the frangible portion of the backing layer and over at least part of a remaining portion of the backing layer;

a second frangible portion incorporated into the label layer aligned with, but smaller in size than, the first frangible portion of the backing layer.

7. The form of claim 6 further comprising an adhesive layer between the backing layer and the label layer, the adhesive having a characteristic that allows separation of the backing and label layers with the application of sufficient separation forces.

8. A labeling system for identification and inventory tracking purposes, comprising:

(a) a backing sheet, having at least one first portion and a second portion separable from the at least one first portion;

(b) at least one main label positioned on the backing sheet and having a bottom surface having a self-adhesive that:

(1) adheres to the respective at least one first portion of the backing sheet, and (2) releasably adheres to the second portion of the backing sheet and, after release from the second portion of the backing sheet, readheres to a selected object, such as a shipping carton;

(c) at least one removable secondary label formed within the periphery of the respective at least one main label, wherein the at least one secondary label releasably adheres to the respective at least one first portion of the backing sheet and, after removal from the at least one first portion of the backing sheet, readheres to a selected object, such as a container; and (d) indicia, at least a portion of which appears on both the at least one main label and the respective at least one secondary label such that the portion of indicia is readable on each of the at least one main label and the respective at least one secondary label after removal of the at least one secondary label from the respective at least one main label.

9. A labeling system, comprising:

(a) a backing sheet, having at least one first portion and a second portion separable from the at least one first portion;

(b) at least one main label positioned on the backing sheet and having a bottom surface having a self-adhesive that:

(1) adheres to the respective at least one first portion of the backing sheet, and (2) releasably adheres to the second portion of the backing sheet and, after release from the second portion of the backing sheet, readheres around a corner of a selected object; and (c) at least one removable secondary label formed within the periphery of the respective at least one main label and having:

(1) a label portion with a self-adhesive that releasably adheres to the respective at least one first portion of the backing sheet and, after removal from the at least one first portion of the backing sheet, readheres to a selected object, such as a container, and (2) a tab portion that does not adhere to the respective at least one first portion of the backing sheet.

10. The labeling system of claim 9, wherein the at least one main label and the respective at least one secondary label are structured to be readhered around the corner of the selected object such that a juncture between the label portion and the respective tab portion is spaced approximately along the corner of the selected object.

11. The labeling system of claim 10, wherein the at least one secondary label is structured to resist bending as the respective at least one main label is readhered around the corner of the selected object such that the respective tab portion extends outwardly from the corner of the selected object.

12. The labeling system of claim 10, wherein the tab portion of the at least one secondary label extends outwardly from the corner of the selected object as the respective at least one main label is readhered around the corner of the selected object such that the tab portion is grippable by a user to thereby allow the user to remove the at least one secondary label from the respective at least one first portion of the backing sheet.

13. The labeling system of claim 10, wherein the tab portion of the at least one secondary label extends outwardly from the corner of the selected object as the respective at least one main label is readhered around the corner of the selected object such that the tab portion is grippable by a user to thereby allow the user to separate the at least one secondary label from the respective at least one main label.

14. The labeling system of claim 9, wherein the backing sheet includes at least one third portion that is separated from the at least one first portion and the second portion of the backing sheet and that has substantially same dimensions and profile as, and is adhered to, the respective tab portion.

15. The labeling system of claim 9, wherein the at least one tab portion has a release agent applied thereto that prevents the at least one tab portion from adhering to the respective at least one first portion of the backing sheet.

16. The labeling system of claim 9, including indicia, at least a selected portion of which appears on both the at least one main label and the respective at least one secondary label such that the selected portion of indicia is readable on each of the at least one main label and the respective at least one secondary label after removal of the at least one secondary label from the respective at least one main label.

\* \* \* \* \*